V. ROYLE & J. ROYLE, Jr.
ROUTING-MACHINES FOR ENGRAVERS' USE.
No. 193,555. Patented July 24, 1877.
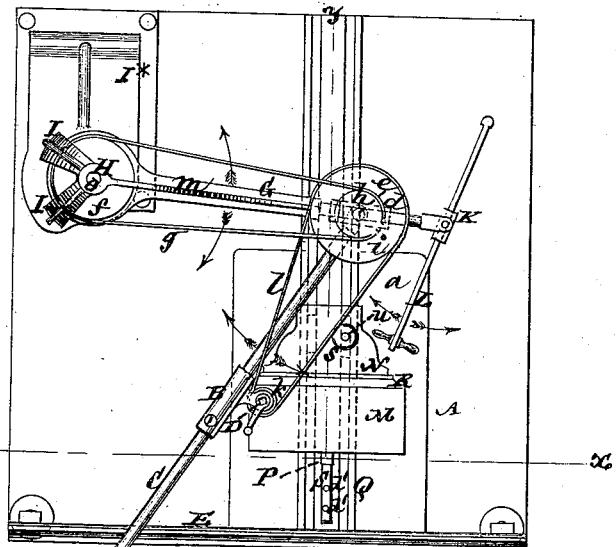
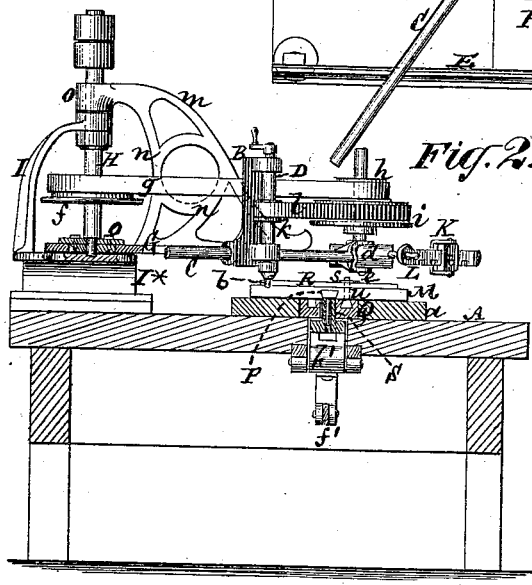
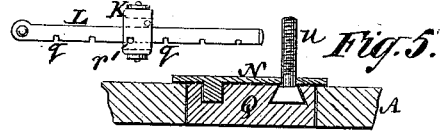
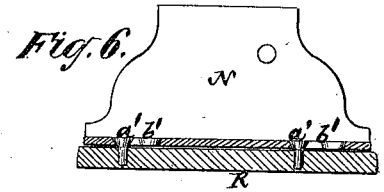
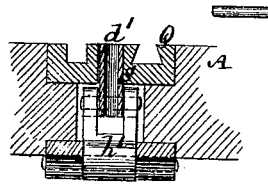
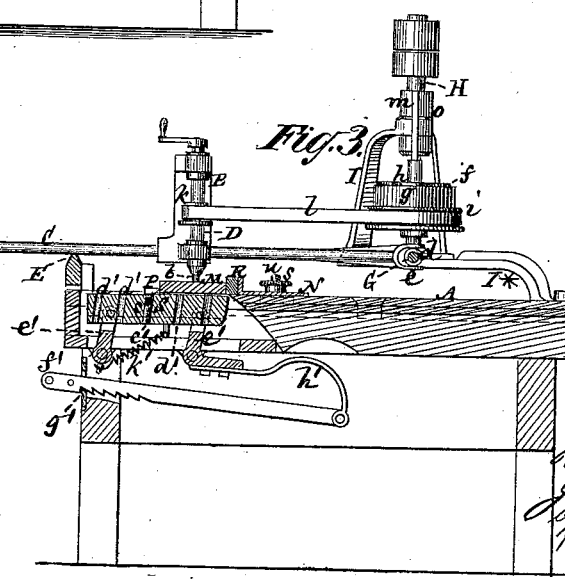
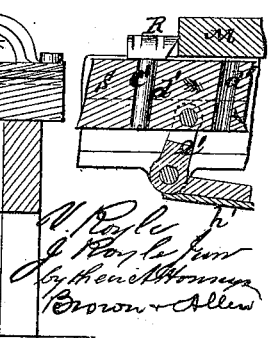

UNITED STATES PATENT OFFICE.

VERNON ROYLE AND JOHN ROYLE, JR., OF PATERSON, NEW JERSEY.

IMPROVEMENT IN ROUTING-MACHINES FOR ENGRAVERS' USE.

Specification forming part of Letters Patent No. 193,555, dated July 24, 1877; application filed May 2, 1877.

*To all whom it may concern:*

Be it known that we, VERNON ROYLE and JOHN ROYLE, Jr., both of Paterson, in the county of Passaic and State of New Jersey, have invented certain new and useful Improvements in Routing-Machines, of which the following is a description, reference being had to the accompanying drawings, forming part of this specification.

This invention relates to routing-machines for use by engravers and others on wood, metal, and other surfaces, and in which a rotating cutter capable of being raised and lowered is carried by a holder upon a jointed lever, which is capable of universal adjustment to provide for the application of the cutter in various directions and to different parts of the surface to be routed.

The invention consists in certain novel constructions and combinations of parts, whereby an enlarged available working-table surface is obtained without impairing the stability of the main swinging arm of the machine; also, increased facilities are afforded for clamping or holding the work, and for preventing slip of the dog which secures it.

Figure 1 represents a plan of a routing-machine constructed in accordance with my invention; Fig. 2, a vertical section of the same on the line $x\ x$; and Fig. 3 a further vertical section thereof on the line $y\ y$. Fig. 4 is a side view of a notched extensible handle, to suit different reaches on part of the operator in his manipulation of the main swinging arm of the machine. Fig. 5 is a vertical section, upon a larger scale, of a sliding clamp used to hold the work; and Fig. 6 a horizontal section through a removable face-plate attached to said clamp. Figs. 7 and 8 are vertical sections, in planes at right angles with each other, of an adjustable dog and means for operating the same, to hold the work on the opposite edge of it to that which bears against the sliding clamp.

A is the bed or table on which the work to be routed rests, and which may be constructed with a raised portion, $a$, to receive the work that, however, may be spread over the whole table.

B is the cutter-head, which is secured at any desired point or place on a lever, C. This cutter-head carries the rotating cutter-spindle D, having the routing-cutter $b$ in its lower end, and adjustable up or down by usual or any suitable means to vary the working depth or projection of the cutter. The forward portion of the lever C freely rests on and is at liberty to freely move over a supporting-rail, E, while the rear end of said lever is connected by a universal joint, $d\ e$, with the main swinging beam or arm G of the machine, to provide for the manipulation of the cutter to, from, and about or over the work, as in other routing-machines, the arm G swinging on or about an upright driving-spindle, H, which is arranged at one side of the table, and which carries a pulley, $f$, that, by means of an endless band, $g$, gives motion to pulleys $h\ i$, from which rotary movement is communicated through a pulley, $k$, and band $l$ to the cutter-spindle D; but instead of, as heretofore, supporting the swinging arm G at or near its outer end, by means of a wheel running on a track which projects from the surface of the table A, or by a spring-rest on said table, either or both of which provisions cripple or obstruct table-surface, and restrict the machine to operating on work of a limited area, we give the necessary rigidity to the arm G by constructing it in the form of a bracket composed of the arm proper as a lower chord or brace, an upper brace, $m$, and intermediate braces $n$, the whole being so constructed that said bracket widens or spreads upward in a backward direction, and terminates at its rear in upper and lower bearings or eyes $o\ o$, through which the spindle H passes. Furthermore, for a like end or purpose—that is, of giving an extended available working area to the table A, we construct the base I* of the support I, which carries the spindle H, of an open loop or neck form to admit of the work being passed under the lower bearing of the spindle H.

The routing-cutter is manipulated about or over the work by the operator working laterally with his one hand the forward portion of the lever C, which rests on the rail E, and by or with his other hand moving the outer end of the arm G to and fro, said operator standing in front of the rail E.

To facilitate manipulation of the arm G, the outer portion of the latter is fitted with a pivoted or vibrating slotted socket, K, through which a notched extensible handle, L, is free to pass and to engage as required, by any one of a series of notches, $q$, with a pin or stud, $r$, in said socket, whereby said handle is made readily adaptable to different reaches.

The work M to be routed, which is here represented as of a very restricted area, is held to its place on the raised portion $a$ of the table A, between a sliding clamp, N, and an adjustable dog, P. The sliding clamp N is adjustable backward or forward along a grooved metal slab, Q, let into the surface of the table, and is secured when adjusted by a button or nut, $s$, which is fitted to screw onto the end of a clamping sliding screw, $u$. Said clamp N is provided on its face or front edge with a removable face plate or bar, R, which is fitted to lock and unlock by a sliding motion and through means of locking-pins or projections $a'\,a'$ and slots $b'\,b'$ of enlarged dimensions at one of their ends, with and from the front edge of the clamp. By thus providing the clamp N with a removable face plate or bar, the latter may be changed for another of different material, or of a different depth to suit different thicknesses or kinds of work, and to allow of the routing-tool, if necessary, being worked over it.

The adjustable dog P has a stem or shank, $c'$, which fits within any one of a series of holes, $d'$, arranged one behind the other in a bar, S, and is made capable of turning within the hole which it fits, to change its clamping edge or face, according to the character of the work to be clamped, the several clamping faces or edges of said dog being differently constructed to suit different kinds of work. The holes $d'$ in the bar S are set sloping backwardly in an upward direction, as shown in Fig. 3, so that when the dog P is set up to the work, its inclined stem will restrain it from slipping out. Apart from this, however, the dog P has a tendency given it to bear down as well as back on the work, and so prevent its slipping, by the bar S within which the dog fits being carried by radial arms or levers $e'\,e'$, which secure to said bar when moved forward a slight downward motion as well, without destroying, however, the parallelism of the bar to the upper surface of the table. Said bar S may be set forward to make the dog P gripe the work by means of a pull rod or bar, $f'$, having a ratchet-surface to effect its engagement with a stop, $g'$, after the dog has been set up to its work, a spring-connection, $h'$, of said bar serving to keep it thus engaged. When the pull rod or bar $f'$ is disengaged from the stop $g'$, a spring, $k'$, serves to throw the bar S up and away from the work to liberate the latter.

Any other suitable mechanism may take the place of the means here described for operating the bar S.

We claim—

1. The support I for the driving-spindle H, constructed with a base, I*, of open-loop form, in combination with the table A and the swinging arm G, having upper and lower bearings $o\,o$, and of bracket-like construction, with an upper brace, $m$, essentially as and for the purpose herein set forth.

2. The removable face plate or bar R, in combination with the sliding and adjustable clamp N, substantially as specified.

3. The sliding bar S, hung on radial arms or levers $e'\,e'$, and arranged so that when moved toward the work it bears downward relatively to the surface of the table on which the work is secured, in combination with the dog P, carried by said bar, essentially as described.

4. The combination of the removable and adjustable dog P, having an inclined stem, $c'$, in combination with the sliding bar S, having a combined forward and downward motion, as described, and provided with a series of oblique apertures, $d'$, for operation in relation with the work, substantially as specified.

5. The combination of the notched extensible handle L with the vibrating slotted socket or piece K, with which said handle engages, and the swinging arm G, essentially as and for the purpose herein set forth.

VERNON ROYLE.
JOHN ROYLE, JR.

Witnesses:
MICHAEL RYAN,
FRED. HAYNES.